J. C. MELCHER.
Apparatus for Destroying Insects.
No. 221,843.  Patented Nov. 18, 1879.
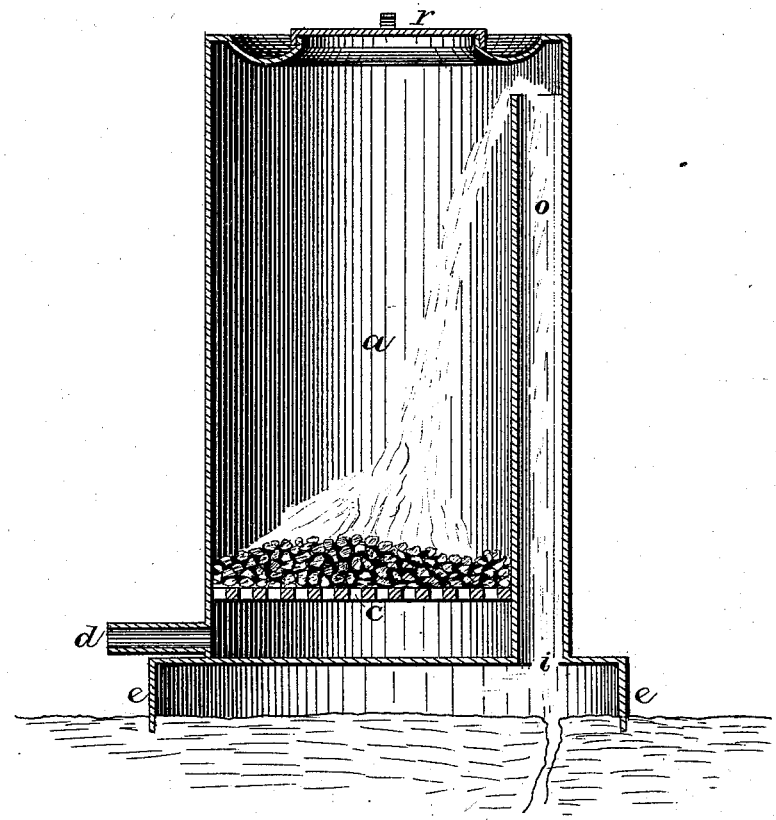

UNITED STATES PATENT OFFICE.

JOHN C. MELCHER, OF O'QUINN, (BLACK JACK SPRING P. O.,) TEXAS.

IMPROVEMENT IN APPARATUS FOR DESTROYING INSECTS.

Specification forming part of Letters Patent No. 221,843, dated November 18, 1879; application filed September 17, 1879.

*To all whom it may concern:*

Be it known that I, JOHN C. MELCHER, of O'Quinn, (Black Jack Spring P. O.,) in the county of Fayette and State of Texas, have invented certain new and useful Improvements in Devices for Destroying Ants and Burrowing Animals of all kinds; and I do hereby declare the following to be a full, clear, and exact description of the invention, such as will enable others skilled in the art to which it pertains to make and use it, reference being had to the accompanying drawing, which forms part of this specification.

My invention relates to an improvement in devices for destroying ants and burrowing animals of all kinds; and it consists in a fire-chamber which has a sharp flange formed all around its bottom to cut slightly into the ground around the ant or animal hole, so as to form a tight joint, and which chamber is provided with an internal pipe to convey the poisonous fumes from the top of the chamber down into the chamber formed by the flange, as will be more fully described hereinafter.

The accompanying drawing represents a vertical section of my invention.

*a* represents a suitable fire-chamber, of any desired shape or size, and which is provided with an opening through its top for the introduction of fuel and the compound which is to be converted into a poisonous vapor for the purpose of destroying the insects or animals. In the bottom of this chamber is formed a suitable grating, *c*, on which the fire is to be built, and leading into this chamber, under the grate, is a pipe, *d*, through which passes a blast of air from a pump, bellows, or other suitable air-forcing engine, not only for keeping the fire burning, but to force the poisonous vapors down into the utmost recesses of the insect's or animal's hole.

The base on which the chamber sets is of larger diameter than the chamber, and extending down from this base is a flange, *e*, which is made sharp enough on its lower edge to readily cut a slight distance into the surface of the earth and thus form a tight joint all around the insect's or animal's hole. This flange is made deep enough to form a chamber into which a considerable volume of smoke and vapor can be forced.

Through the base, at one side of the bottom of the chamber, is made an opening, *i*, and over this opening, and extending up the side of the chamber to near its top, is the pipe *o*, through which the smoke and vapor pass down into the chamber under the base.

The fire having been made in the fire-chamber, the poisonous compound is dropped in upon it, and then the cover *r* is placed upon the opening in the top of the chamber and the air-forcing machine is started. All of the smoke and the poisonous vapors are then forced down through the pipe *o* from the top of the fire-chamber into the chamber under the base, from whence they are forced down into the insect's or animal's hole.

By means of this simple contrivance all insects or animals that burrow in the ground can be readily annihilated.

Having thus described my invention, I claim—

In a device for destroying insects and small animals, the combination of the fire-chamber provided with an opening for the insertion of fuel with a pipe, *d*, for the introduction of a blast of air, and the pipe *o*, for conveying the products of combustion into the chamber formed over the hole by the flange *e*, substantially as shown.

In testimony that I claim the foregoing I have hereunto set my hand this the 9th day of September, 1879.

JOHN C. MELCHER.

Witnesses:
 J. F. MELCHER,
 C. L. MELCHER.